(12) United States Patent
Fulton et al.

(10) Patent No.: US 6,772,192 B1
(45) Date of Patent: Aug. 3, 2004

(54) SOFTWARE DOWNLOAD AND DISTRIBUTION VIA IMAGE BUILDING AND MULTICAST

(75) Inventors: John S. Fulton, The Woodlands, TX (US); Charles H. Dickson, Spring, TX (US); William R. Bakke, Cypress, TX (US); Gunnar P. Seaburg, The Woodlands, TX (US); Scott M. Fleming, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/515,567

(22) Filed: Feb. 29, 2000

(51) Int. Cl.[7] .............................................. G06F 15/16
(52) U.S. Cl. ....................... 709/203; 719/311; 719/330; 717/174; 717/176
(58) Field of Search .................. 395/712; 717/174–176, 717/177; 709/203, 304, 330; 719/330

(56) References Cited

U.S. PATENT DOCUMENTS

| | | | | |
|---|---|---|---|---|
| 5,963,743 A | * | 10/1999 | Amberg et al. | 717/174 |
| 5,978,590 A | * | 11/1999 | Imai et al. | 717/177 |
| 5,995,757 A | * | 11/1999 | Amberg et al. | 717/175 |
| 6,038,399 A | * | 3/2000 | Fisher et al. | 717/178 |
| 6,182,275 B1 | * | 1/2001 | Beelitz et al. | 717/175 |
| 6,282,711 B1 | * | 8/2001 | Halpern et al. | 717/175 |
| 6,321,274 B1 | * | 11/2001 | Shakib et al. | 709/330 |
| 6,353,928 B1 | * | 3/2002 | Altberg et al. | 717/175 |
| 6,487,522 B1 | * | 11/2002 | Smith et al. | 702/186 |
| 6,633,899 B1 | * | 10/2003 | Coward | 709/202 |

* cited by examiner

*Primary Examiner*—John Follansbee
*Assistant Examiner*—Jinsong Hu

(57) ABSTRACT

The present invention provides a method and apparatus for installing software on a computer. In one aspect of the present invention, a method is provided that includes building a disk image from requested software components distributed over a network.

14 Claims, 5 Drawing Sheets

SOFTWARE DOWNLOAD AND DISTRIBUTION VIA IMAGE BUILDING AND MULTICAST

BACKGROUND OF THE INVENTION

1. Field of the Invention

This invention relates generally to product manufacturing, and, more particularly, to a method and apparatus for the distribution and installation of software to a computer.

2. Description of the Related Art

One step in the process of manufacturing a computer is the installation of software on the computer. After at least the basic hardware components for the computer are assembled, software is loaded onto the computer for processing purposes, testing purposes, end-user software, and other uses The installed software generally matches the hardware assembled for the particular computer. The software may also be pre-ordered software that the manufacturer has agreed to provide to the customer.

A conventional method for installing such software is to build one disk image for a fixed hardware and software configuration and install that image on all assembled computers fitting that configuration. Using the disk image saves manufacturers much time since they do not have to execute an installation program for each software component. The disk image is built by installing the required software on a disk drive of the first computer assembled and then having another piece of software make an identical copy of the entire disk drive. The disk image is then distributed to all newly assembled computers and copied onto the disk drive of the new computer. The newly assembled computer is then identical to the first computer assembled.

In large manufacturing facilities, distribution of the disk image occurs over a network. The newly assembled computer is attached to the network and becomes a client. A server holds one disk image for each hardware/software configuration and sends the appropriate disk image over the network to a client upon a request from the client. This process is automated and allows the installation of software for many machines. If the computers are assembled and placed on the network at the same time, the server can broadcast the disk image to many computers at the same time. The software installation for many computers is then done in parallel by synchronizing the distribution of an entire disk image to the computers.

As computer manufacturers increase the number of options for different hardware and software configurations, the process of software installation becomes more burdensome. A unique disk image is required to be built and stored for each combination of hardware and software choices ordered by the customer. As more clients requiring different disk images are attached to the network, fewer computers can complete the software installation step in parallel, thereby slowing the entire production line.

The present invention is directed to overcoming, or at least reducing the effects of, one or more of the problems set forth above.

SUMMARY OF THE INVENTION

In one aspect of the present invention, a method is provided for distributing software components from a server to first and second clients on a network. A first request for software components is sent from the first client to the server. The requested software components are transmitted from the server over the network in response to the first request. A second request for software components is sent from the second client to the server. The first and second clients monitor the network for the first and second requested software components being transmitted on the network. The first and second clients receive the first and second requested software components, respectively. The first client builds a disk image from the received software components. The server determines the software components not yet received by the second client. The server transmits the determined software components. The second client receives the determined software components, and finally, the second client builds a disk image from the received software components.

In another aspect of the instant invention, a method for controlling a server to deliver requested software components to a plurality of network clients is provided. A first request for a first set of software components is received. A second request for a second set of software components is also received. The first and second sets of software components are combined to form an consolidated set of software components. The consolidated set of software components are transmitted over the network.

In yet another aspect of the instant invention, an apparatus is provided for controlling delivery of requested software components to a plurality of clients on a network. A server is adapted to receive a first request and a second request for a first and second set of software components, respectively. The server combines the first and second sets of software components to form a consolidated playlist of software components, and transmits the consolidated playlist of software components over the network.

BRIEF DESCRIPTION OF THE DRAWINGS

The invention may be understood by reference to the following description taken in conjunction with the accompanying drawings, in which like reference numerals identify like elements, and in which.

Figure 1:
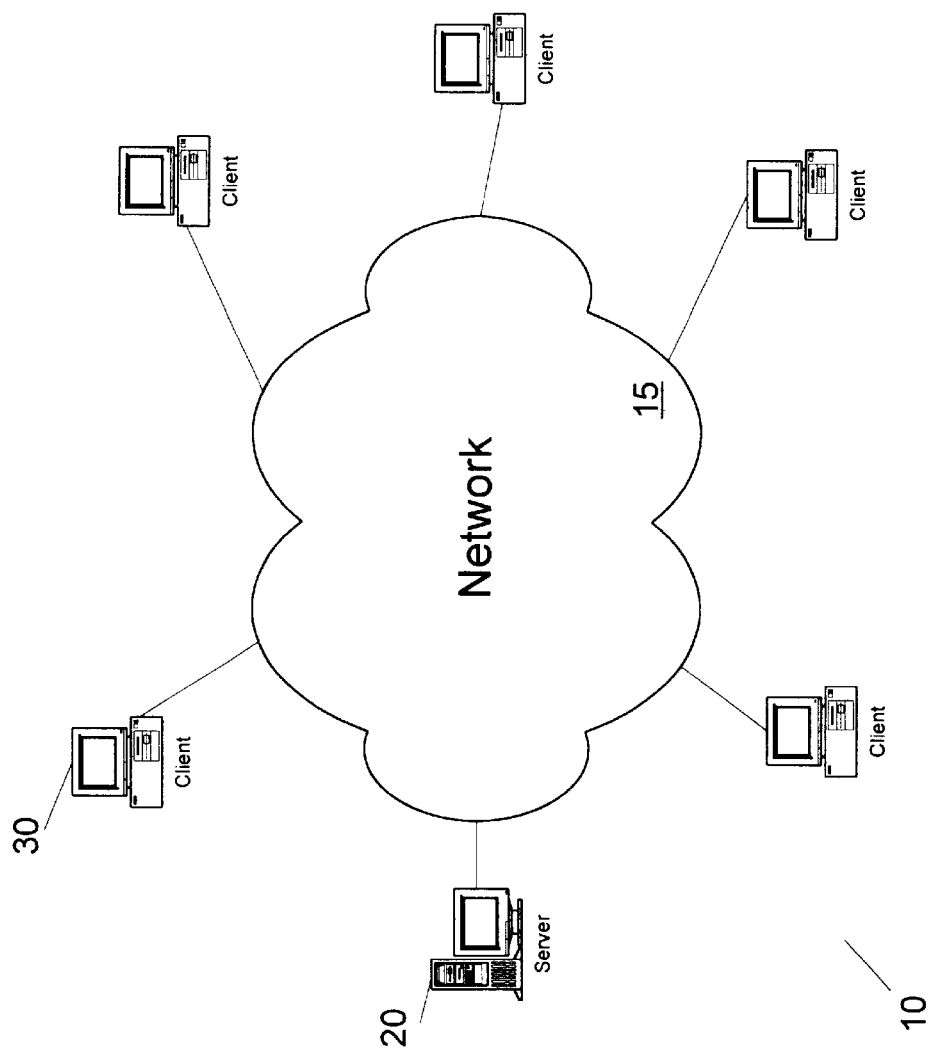
FIG. 1 illustrates a stylized block diagram of an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates one embodiment of an apparatus 10 of the present invention. The present invention facilitates the distribution and installation of software on a computer. By implementing the apparatus 10, manufacturers can efficiently build computers to the specifications of its customers. The apparatus 10 consists of a server 20, a network 15 and one or more clients 30. The clients 30 require specific software from the server 20. The software is delivered to the clients 30 from the server 20 through the network 15 at about the same time. Accordingly, the present invention substantially reduces the time required to install software on the clients 30.

FIG. 1 illustrates the network 15 connecting the server 20 and a plurality of clients 30. The network 15 is capable of handling communication between the server 20 and the clients 30, as well as allowing the clients 30 to listen and receive all communication sent on the network 15 by the server 20. The network 15 is also capable of adding or removing the clients 30 at any time without disruption of communication. The network 15 may be any network known to the art. A particular embodiment may, for instance, employ an ethernet network using TCP/IP protocols.

The server 20 responds to requests from the clients 30. The clients 30 may be put on the network 15 at any time. Once on the network 15, the clients 30 announce their existence to the server 20. The clients 30 may then request a list of software components (hereinafter referred to as the "playlist") from the server 20. The playlist may consist of individual file names or the name of a software package consisting of many files. The client 30 may also provide the server 20 with an identification code by which the server 20 would already know the required playlist for the client 30. The server 20 combines all of the playlists received from the clients 30 into a consolidated playlist. The server 20 then broadcasts all of the required software components specified in the consolidated playlist over the network 15 to all of the clients 30. The server 20 may at any time reorder the consolidated playlist to more efficiently distribute all of the software components. The consolidated playlist on the server 20 is updated as software components are sent to the clients 30 and whenever each of the clients 30 is attached to or removed from the network 15.

The clients 30 send playlist requests to the server 20 and receive software components from the server 20 on the network 15. The clients 30 listen to all of the communications on the network 15 and only store the software components they require. The software components are stored in such a way as to build a disk image required by the clients 30. The disk image is the state of a disk at any given time. A specific disk image is required for each client 30. When all of the software components are received by one of the clients 30, the disk image is complete and the client 30 may be taken off of the network 15 for further assembly or processing elsewhere. As the disk image is split into many software components, the client 30 may receive any software components they require in any order. This allows the build process to proceed asynchronously. Each of the clients 30 may begin and complete building their disk image irrespective of the other clients 30.

Figure 2:
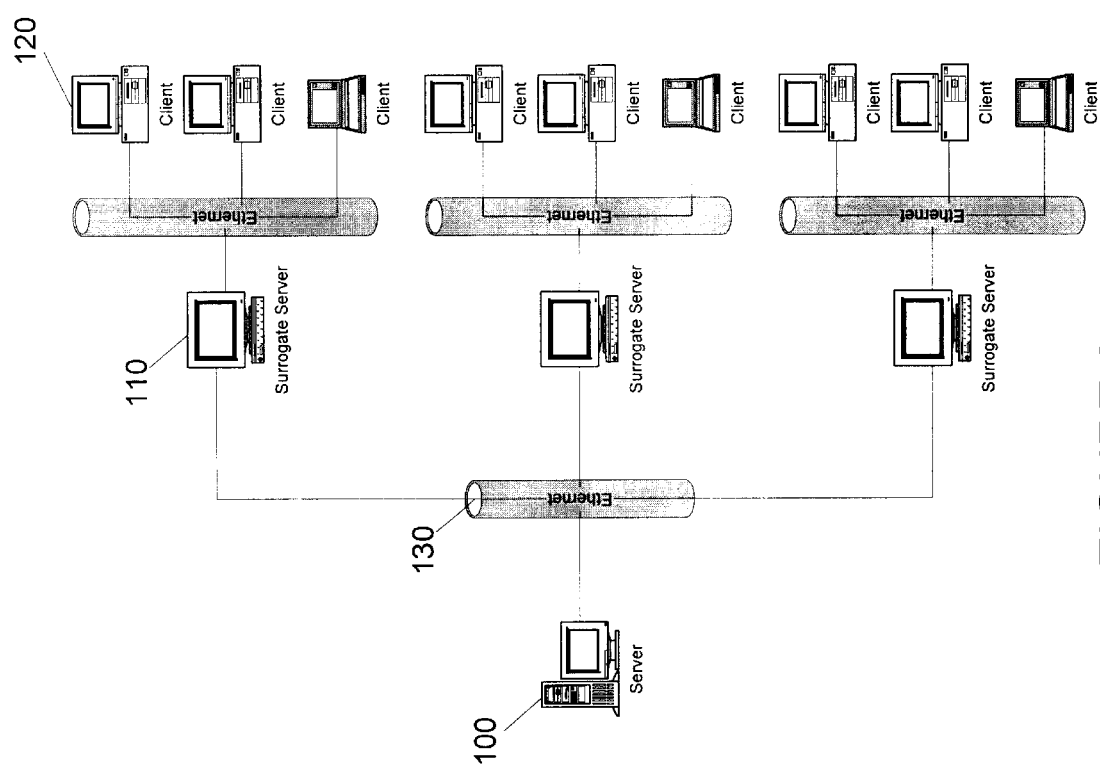
FIG. 2 depicts one embodiment of a method that can be employed by the apparatus of FIG. 1.

FIG. 2 illustrates a more detailed block diagram of one embodiment of the apparatus of FIG. 1. A server 100 communicates through surrogate servers 110 to clients 120 through an ethernet network 130. The surrogate servers 110 help reduce the amount of network bandwidth required by the server 100 by mirroring software components to send to the clients 120. In this manner, the server 100 may send short commands to the surrogate servers 110 to send software components to the clients 120 instead of the large software components on the ethernet network 130.

Figure 3:
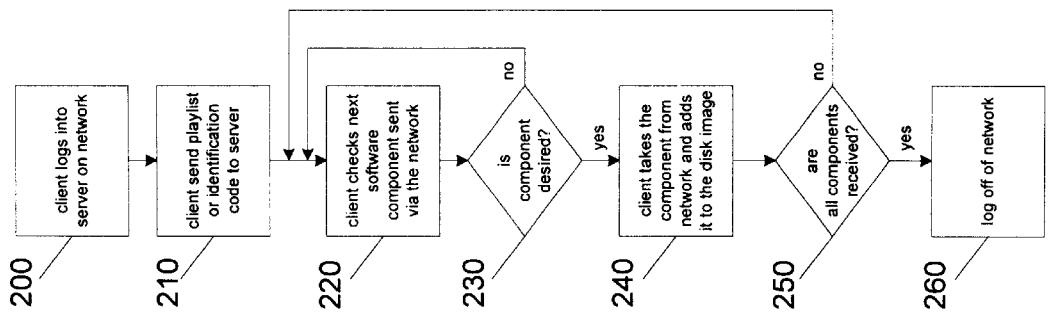
FIG. 3 depicts a flowchart illustrating the steps of operation of a client of FIG. 1.

FIG. 3 is a flowchart illustrating one embodiment of the operation of the clients 30 shown in FIG. 1. As mentioned above, the server 20 fills requests from the clients 30. At block 200, the client 30 logs into the server 20. The client 30 may or may not wait for an acknowledgement from the server 20. Next, at block 210, the client 30 sends a playlist or an identification code to the server 20. At block 220, the client 30 listens to all of the communication on the network 15. In block 230, each of the clients 30 decides if the software component on the network 15 is one that is required to build its disk image. If the software component is not desired, the client 30 returns to block 220. At block 240, the client 30 desires the software component, receives the software component from the network 15 and adds the software component to the disk image. In block 250, the client 30 determines if all of the software components have been received. If not, the client 30 returns to block 220, and the client 30 resumes monitoring the network for desired software components. If all software components have been received, the client 30 enters block 260 and logs off of the network 15. The disk image has been built and the client 30 is free for further assembly or processing.

Figure 4:
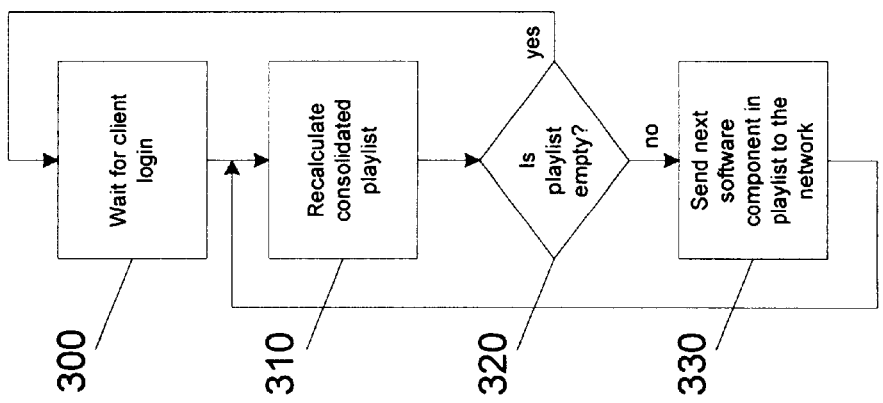
FIG. 4 depicts a flowchart illustrating the steps of operation of a server of FIG. 1.

FIG. 4 is a flowchart illustrating one embodiment of the operation of the server 20 in FIG. 1. At block 300, the server 20 is waiting for a new client 30 to log in. When the client 30 logs in, a playlist or computer identification code is received by the server 20 from he client 30. In block 310, the server 20 recalculates the consolidated playlist to include the new client 30 playlist requirements. At block 320, the server 20 determines if the consolidated playlist is empty. If it is empty, the server 20 waits for a client 30 to log in at block 300. If the consolidated playlist is not empty, at block 330 the server 20 sends a software component to the clients 30 over the network 15. Once the software component is sent, the consolidated playlist is again recalculated in block 310. The method is asynchronous with respect to the clients 30. If a client 30 is put on the network 15 at anytime, the server 20 enters block 300 to accept the client 30 log in.

Figure 5:
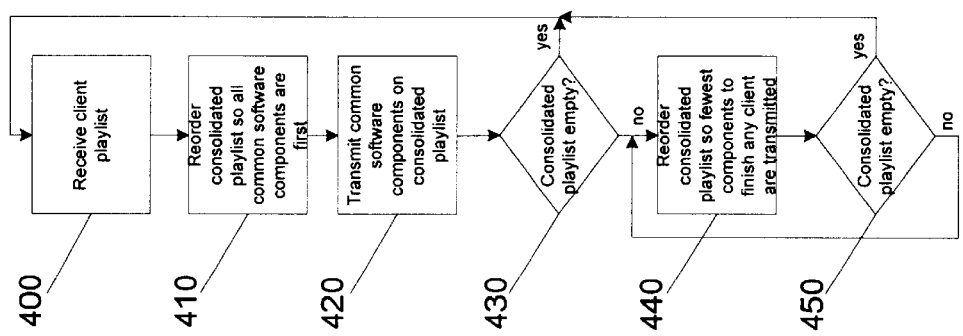
FIG. 5 depicts a flowchart illustrating the steps of recalculating a consolidated playlist of FIG. 4.

FIG. 5 illustrates one embodiment of a more detailed flowchart of the operation described in block 310. In block 400, a server 20 receives a playlist from a client 30 that has logged into the server 20. The server 20 then recalculates the consolidated playlist in block 410 by combining the consolidated playlist and the client 30 playlist such that all of the software components that are in common between the client 30 playlist and the consolidated playlist are ordered first in the consolidated playlist. Next, at block 420, the server 20 transmits all of the common components in the consolidated playlist. In block 430, the server 20 checks to see if the consolidated playlist is empty. If so, the server 20 returns to block 400. In block 440, the consolidated playlist is reordered such that the software components for the client 30 with the fewest required software components are first transmitted. The server 20 decides if the consolidated playlist in block 450 is empty. If so, the server 20 waits for another client 30 playlist in block 400. At anytime during the reorder operation, the server 20 may receive a client 30 playlist and proceed to block 400. Different embodiments may order the consolidated playlist based on different criteria. One embodiment may order the software components based on the size of the component. Another embodiment may treat the playlist of certain clients 30 with different priority, and transmit those software components first.

In summary, the present invention offers an efficient method to distribute and install software through asynchronous disk image building. The clients 30 communicate with the server 20 through the network 15 to request and receive required software components to build a disk image.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for distributing software components from a server to first and second clients on a network, comprising:

sending a first request for software components from said first client to said server;

transmitting the requested software components from said server over said network in response to the first request;

sending a second request for software components from said second client to said server;

the first and second clients monitoring the network for the first and second requested software components being transmitted on said network;

the first and second clients receiving the first and second requested software components, respectively;

the first client building a disk image from said received software components;

the server determining the software components not received by the second client;

the server transmitting the determined software components;

the second client receiving the determined software components; and the second client building a disk image from said received software components.

2. A method, as set forth in claim 1, wherein determining the software components not received includes comparing the software components sent since receiving the second request with the software components included in the second request.

3. A method, as set forth in claim 1, wherein sending a first request includes sending a playlist of desired software components.

4. A method, as set forth in claim 1, wherein sending a first request includes sending an identification code representative of a playlist of desired software components.

5. A method, as set forth in claim 1, wherein transmitting the requested software components includes serially transmitting each requested software component.

6. A method for controlling a server to deliver requested software components to a plurality of network clients, comprising:

receiving a first request for a first set of software components from a first client;

receiving a second request for a second set of software components from a second client;

combining the first and second sets of software components at the server to form a consolidated set of software components; and transmitting the consolidated set of software components over said network.

7. A method, as set forth in claim 6, including:

receiving a third request for a third set of software components;

combining the third set of software components with consolidated set of software components to form a newly consolidated set of software components; and transmitting the newly consolidated set of software components over said network.

8. A method, as set forth in claim 6, wherein transmitting the consolidated set of software components includes transmitting the software components in a preselected order.

9. A method, as set forth in claim 8, wherein transmitting the software components in a preselected order includes transmitting the software components in an order corresponding to the number of requests received for said software components.

10. A method, as set forth in claim 8, wherein transmitting the software components in a preselected order includes transmitting the software components in an order corresponding to the size of said software components.

11. An apparatus for controlling delivery of requested software components to a plurality of clients on a network, comprising:

a server adapted to receive a first request from a first client and a second request from a second client for a first and second set of software components, respectively, combine the first and second sets of software components to form a consolidated playlist of software components, and transmit the consolidated playlist of software components over said network.

12. An apparatus, as set forth in claim 11, wherein the server is adapted to reorder the consolidated playlist and transmit the reordered consolidated playlist of software components over said network.

13. An apparatus, as set forth in claim 12, wherein said server is adapted to reorder the consolidated playlist based on the number of common components in the consolidated playlist and client playlists.

14. An apparatus, as set forth in claim 12, wherein said server is adapted to reorder the consolidated playlist based on the size of each of the software components.

* * * * *